(12) United States Patent
Garcia

(10) Patent No.: US 6,315,334 B1
(45) Date of Patent: Nov. 13, 2001

(54) INSTANT PIPE JOINING SYSTEM

(76) Inventor: Miguel Angel Gutierrez Garcia, Lerdo de Tejada No. 899, Colonia El Lechugal, C.P. 56350, Santa Catarina, Nuevo Leon (MX)

( * ) Notice: Subject to any disclaimer, the term of this patent is extended or adjusted under 35 U.S.C. 154(b) by 0 days.

(21) Appl. No.: 09/351,487

(22) Filed: Jul. 13, 1999

(30) Foreign Application Priority Data

Jul. 15, 1998 (MX) ..................................... 98197

(51) Int. Cl.$^7$ ................................. F16L 21/08
(52) U.S. Cl. ........................... 285/360; 285/376
(58) Field of Search .................... 285/376, 360, 285/401, 349, 914

(56) References Cited

U.S. PATENT DOCUMENTS

| | | | |
|---|---|---|---|
| 25,117 | * 8/1859 | Heneage | 285/360 |
| 744,646 | * 11/1903 | Tietz | 285/376 |
| 794,539 | * 7/1905 | O'Brien | 285/376 |
| 795,069 | * 7/1905 | Settlage | 285/376 |
| 1,194,793 | * 8/1916 | Styers | 285/376 |
| 1,232,193 | * 7/1917 | Bowles | 285/376 |
| 1,309,830 | * 4/1919 | Wanamaker | 285/376 |

* cited by examiner

Primary Examiner—Eric K. Nicholson
(74) Attorney, Agent, or Firm—Harrison & Egbert

(57) ABSTRACT

A new system for the immediate joining of lengths of pipe is presented whose characteristics allow the handling of the liquid without leaks or losses, as well as being able to be disassembled in the same way and conserve it once it has been used. The main parts of this new pipe joining system can be summarized in that they consist of a length of pipe whose ends have a different geometry, i.e., one end has a bulge with a greater diameter and which is called the female connection, whilst the end has several edges or protuberances, and which is called the male connection, and such female connection has on its front a hole whose geometry is not exactly circular, but rather has several cut-outs placed in an equidistant manner and correlated to the end of the pipe with edges or protuberances of the male connection, and the inside of such end has a channel or groove, followed by an annular section where a gasket made and based on elastomers may be placed, and because the other end of the pipe includes a series of protuberances, distributed in an equidistant manner and correlated to the entrance of the female connection.

4 Claims, 3 Drawing Sheets

INSTANT PIPE JOINING SYSTEM

TECHNICAL FIELD

The present invention relates to devices for joining lengths of pipe together.

SCOPE OF THE INVENTION

A new system for the immediate joining of lengths of pipe is presented whose characteristics allow the handling of the liquid without leaks or losses, as well as being able to be disassembled in the same way and conserve it once it has been used.

Therefore, one purpose of this invention is to provide a rapid joining system for lengths of pipe.

Another goal of this invention is to be able to join and separate lengths of pipe immediately without the need to utilize specialized tools.

Another objective of this invention is to be able to utilize the pipes for the suitable handling of fluids wherein due to their nature, they have to be changed from place to place and in some cases even removed.

This invention has its field of action among pipes, connections, accessories and adapters for pipes.

BACKGROUND ART

Several decades ago it was traditional for good plumbing installations in houses and buildings to be made of cast iron pipes and steel pipes for factory installations. In the case of handling fluids whose management is instantaneous, hoses have been utilized and for irrigation management, complex systems which include wheels, sprinklers and rigid pipes have been used.

Many of the methods followed to join pipes to their connections utilize crafts methods, which means they require specialized and thus expensive labor, as well as the use of joining materials, such as tarred marline and braid, leads, soldering compounds, and other products.

Around the years 1600 or 1700 cast iron pipes started to be used and it wasn't until 1930 in Germany when plastic pipes were used for the first time, specifically PVC although its acceptance and use became gradually more generally derived from the efficient technology utilized in the manufacture of materials, as well as due to the discovery and application of new plastic resins.

Plastic pipes and connections are produced from polymeric resins that basically come from the petrochemical industry. This resins when mixed with other materials such as stabilizers, lubricants, modifiers and pigments, have a combination of characteristics that allow them to be molded by extrusion to make pipes, and by injection to obtain connections and accessories.

Along another line of thinking, processes exist in which the spontaneous handling of fluids is required, and in many cases hoses are utilized. However, in some cases the use of threaded type pipes is more convenient.

The same can be said for pipes for irrigation, which due to their very nature have to be changed from place to place.

Threaded pipes are utilized for the described purposes, although these have the disadvantage that they have to be assembled and disassembled, above all when they have to moved from place to place, such as in the case of irrigation.

There are also plastic pipes on the market which are coupled together by means of a bell and spigot with a rubber ring, having the great advantage of acting as an expansion joint to absorb the contractions and expansions caused by changes in temperature as well as possessing adequate airtightness. However, to achieve this, a cement must be utilized.

Joining systems have also been developed using quick joints, which use hose clamps with a hook that adjusts the spigot to the bell.

The aforementioned disadvantages are simply solved using the proposed invention, which can advantageously compete against the other inventions described above, having as its unique characteristic the fact that it can be assembled and disassembled immediately.

SUMMARY OF THE INVENTION

The present invention is a system for the immediate joining of lengths of pipe together. The system uses a length of pipe with ends of different geometry. One end has a bulge with a greater diameter and is the female connection. The other end has several protuberances and is the male connection. The female connection has a non-circular hole on nits front. In particular, the female connection has several cut-outs placed in an equidistant manner from each other and which correspond to the protuberances on the male connection. A channel is formed in this end. A gasket is received in an annular section at this end.

BRIEF DESCRIPTION OF THE DRAWINGS

The characteristic details of this novel system to join pipes are clearly shown in the following description and the attached drawings, as well as the illustration and following the same reference numbers to indicate the shown parts and figures.

FIG. 2 is another view of the end of the pipe, showing the cut-outs which the exterior protuberances of the other length of pipe pass through;

FIG. 3 is a plan view of the end of the pipe, showing the cut-outs which the exterior protuberances of the other length of pipe pass through;

DETAILED DESCRIPTION OF THE INVENTION

Figure 1:
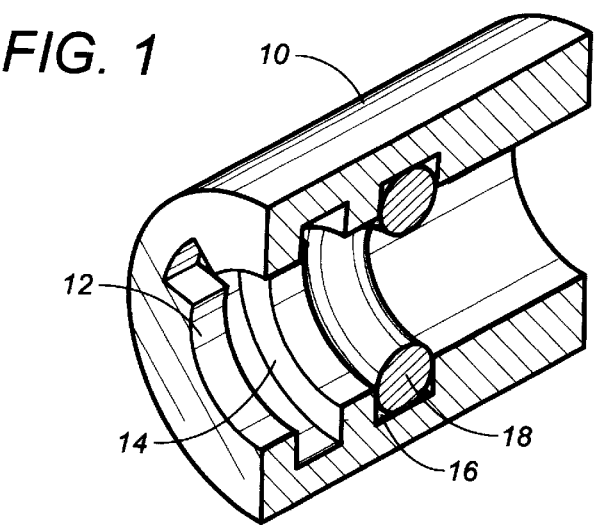
FIG. 1 is a cross-section view of one end of the pipe, showing a slide channel.
Figure 2:
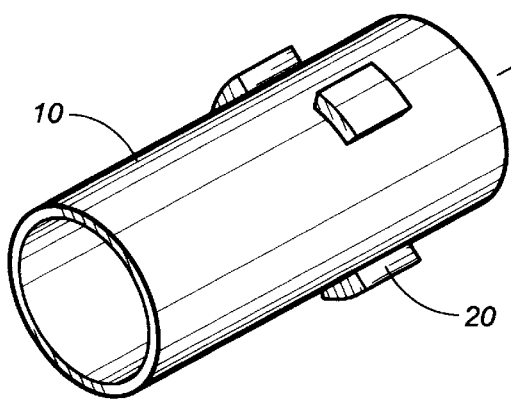
Figure 3:
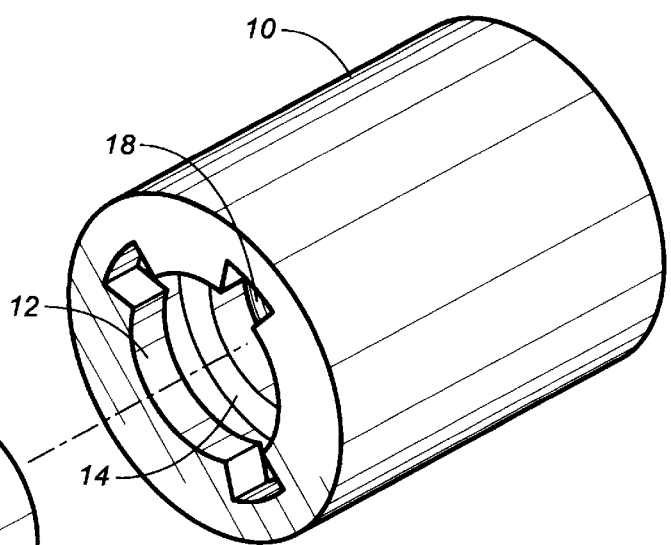
Figure 4:
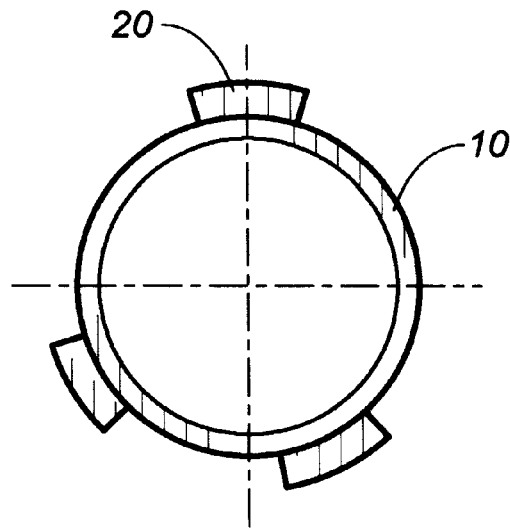
FIG. 4 is a view of the other end of the pipe, showing the exterior protuberances.
Figure 5:
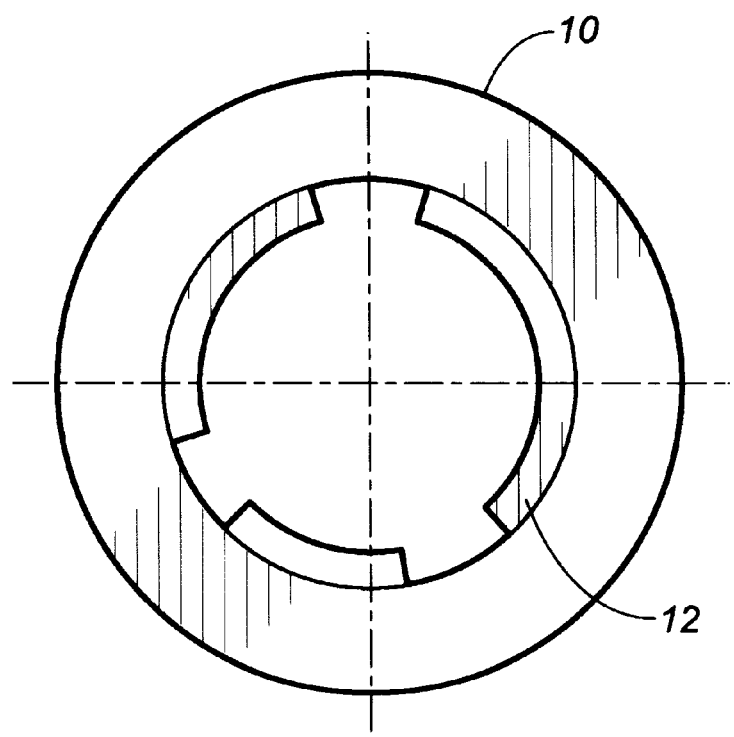
FIG. 5 is a plan view of the end of the pipe with the exterior protuberances.
Figure 6:
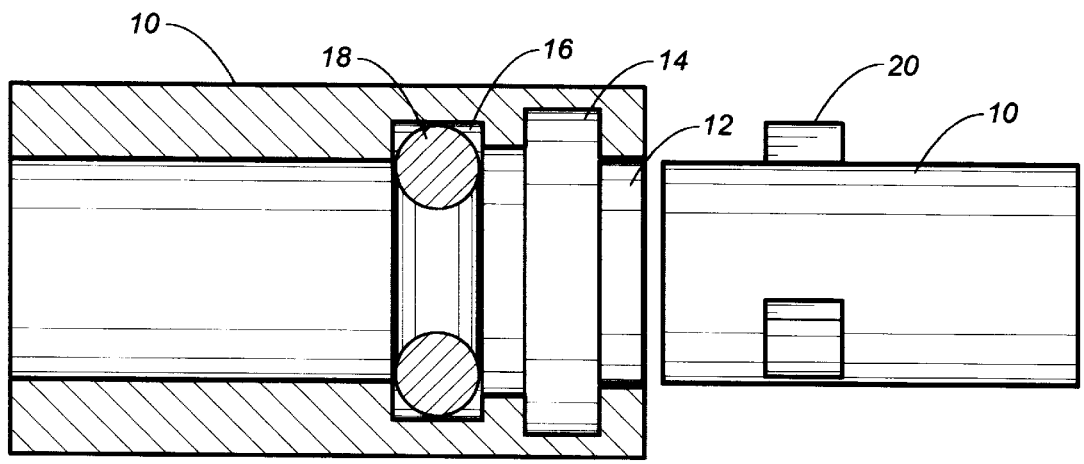
FIG. 6 is a view showing the joint of the ends of the pipe.

Referring to such figures, this instant pipe interconnection system, includes a length of pipe 10, whose ends have different geometries, i.e., one ends has a bulge with a greater diameter 12, while the other end has several edges or protuberances 20, distributed in an equidistant manner.

The length with the greatest diameter is called the female connection, while the other end with the protuberances is called the male connection, although this type is also known as bell connections.

The length with the greatest diameter 12, has a hole at the front whose geometry is not exactly circular, but rather has several cut-outs placed in an equidistant manner and correlated to the end of the pipe with edges or protuberances 20.

The inside of the length with the greatest diameter 12, has a channel or groove 14, followed by an annular section 16, where an O-ring type gasket can be placed 18.

Depending on the physical and chemical properties of the fluid to be handled such as density, viscosity, degree of evaporation, etc., the gasket 18 can be installed or removed as in some cases a much greater degree of airtightness is required. However, it should be underlined hat the joined lengths of pipe have a suitable degree of airtightness, which is not affected by the continuous handling of the pipe.

The other end of the pipe consists of a series of protuberances which have also been called edges 20, distributed in an equidistant manner and correlated to the to the entrance of the length with the greatest diameter 12. These edges or protuberances 20, are introduced into the hole at the end of the pipe with the greatest diameter and then turned to one side, joining and securing the two ends.

At the moment of rotating the two connections, the edges or protuberances 20 move along the channel 16, in a smooth fashion, the former having dimensions correlated to the channel, which assures airtightness.

In order to separate the lengths of pipe, the above procedure is followed in reverse, and therefore the lengths of pipe may be transported somewhere else and be reassembled.

Having described the invention, it is considered as a novelty and therefore, the contents of the following clauses is claimed as our property.

I claim:

1. A pipe joining system comprising:

a first pipe member having an interior passageway and an opening at one end, said opening having a diameter with three cut-outs spaced equidistant from each other at said opening, said first pipe member having an annular groove formed in an inner wall thereof and spaced inwardly from said one end, said three cut-outs communicating with said annular groove, said first member having an annular section formed in said inner wall on a side of said annular groove opposite said one end, said annular section having an O-ring gasket received therein, said first pipe member being formed of a polymeric material, said interior passageway being of a non-threaded constant diameter on a side of said annular section opposite said annular groove; and a second pipe member having an end removably received within said interior passageway of said first pipe member through said one end of said first pipe member, said first pipe member having three protuberances extending radially outwardly from an exterior thereof and spaced from said one end of said second pipe member, said three protuberances corresponding in orientation and shape to said three cut-outs of said first pipe member, said three protuberances being rotatably received within said annular groove of said first pipe member, said exterior surface of said second pipe member between said end of said second pipe member and said three protuberances being of constant diameter and extending through and in liquid-tight engagement within said O-ring gasket, said second pipe member extending outwardly of said one end of said first pipe member, said second pipe member having a diameter less than a diameter of said first pipe member at said one end of said first pipe member, said second pipe member being formed of a polymeric material.

2. The system of claim 1, said O-ring gasket being removably received within said annular section.

3. The system of claim 1, said second pipe member being rotatable within said first pipe member such that a certain rotation aligns said three protuberances respectively with said three cut-outs so as to allow said second pipe member to slide outwardly of said pipe member.

4. The system of claim 1, said three protuberances having a thickness matching the width of said annular groove of said second pipe member.

* * * * *